(12) United States Patent
Weston et al.

(10) Patent No.: US 12,467,487 B2
(45) Date of Patent: Nov. 11, 2025

(54) ACTIVE IONIC PROPULSION SYSTEM FOR MOTOR VEHICLES

(71) Applicant: Ford Global Technologies, LLC, Dearborn, MI (US)

(72) Inventors: Keith Weston, Canton, MI (US); Alex Allmandinger, Ferndale, MI (US); Matthew Arthur Titus, Livonia, MI (US); Lorne Forsythe, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 556 days.

(21) Appl. No.: 17/873,711

(22) Filed: Jul. 26, 2022

(65) Prior Publication Data

US 2024/0035497 A1  Feb. 1, 2024

(51) Int. Cl.
*F15D 1/00* (2006.01)
*B62D 35/00* (2006.01)

(52) U.S. Cl.
CPC ......... *F15D 1/0075* (2013.01); *B62D 35/005* (2013.01); *B62D 35/007* (2013.01)

(58) Field of Classification Search
CPC .... B62D 35/00; B62D 35/001; B62D 35/005; B62D 35/007; B62D 35/008; B62D 35/02; F15D 1/0075
USPC .......... 296/180.1, 180.2, 180.3, 180.4, 180.5
See application file for complete search history.

(56) References Cited

U.S. PATENT DOCUMENTS

| 7,887,119 B2 * | 2/2011 | Ramsay ................. B62D 35/02 296/180.1 |
| 8,235,072 B2 | 8/2012 | Roy |
| 8,382,029 B2 | 2/2013 | Roy |
| 9,067,674 B2 | 6/2015 | Nordin et al. |

(Continued)

FOREIGN PATENT DOCUMENTS

| EP | 3521127 | 10/2020 |
| JP | 2020012618 | 1/2020 |

(Continued)

OTHER PUBLICATIONS

Roy et al., Demonstration of a Wingless Electromagnetic Air Vehicle, Applied Physics Research Group Final Report, 56 pages, University of Florida, Dec. 20, 2011.

(Continued)

*Primary Examiner* — Jason S Daniels
(74) *Attorney, Agent, or Firm* — Burris Law, PLLC

(57) ABSTRACT

An ionic airflow management system for a motor vehicle includes a controller, a power supply in communication with the controller, at least one exterior component of a motor vehicle having an integral electrode in electrical communication with the power supply, the integral electrode comprising a cathodic terminal portion and an anodic terminal portion oriented relative to a managed airflow vector, and at least one sensor in communication with the controller, the at least one sensor including a speed sensor. The power supply receives signals from the controller to supply a predetermined amount of electrical power to the integral electrode based on a threshold speed detected by the speed sensor in an active mode. The power supply receives signals from the controller to switch off electrical power to the integral electrode below the threshold speed in an inactive mode.

20 Claims, 13 Drawing Sheets

(56) References Cited

U.S. PATENT DOCUMENTS

| | | | |
|---|---|---|---|
| 9,282,623 B2 | 3/2016 | Roy et al. | |
| 10,011,344 B1* | 7/2018 | Santavicca, Jr. | B64C 23/005 |
| 10,704,323 B2 | 7/2020 | Chen | |
| 11,103,881 B2* | 8/2021 | Salandre | B03C 3/06 |
| 11,485,430 B2* | 11/2022 | Watanabe | B62D 25/12 |
| 11,492,101 B2* | 11/2022 | Kato | B64C 23/005 |
| 11,518,451 B2* | 12/2022 | Watanabe | B62D 37/02 |
| 11,603,146 B2* | 3/2023 | Watanabe | B62D 35/02 |
| 11,639,203 B2* | 5/2023 | Watanabe | B62D 35/00 296/180.1 |
| 11,661,122 B2* | 5/2023 | Watanabe | H05H 1/2406 296/180.1 |
| 11,691,679 B2* | 7/2023 | Watanabe | B62D 35/02 296/180.1 |
| 11,840,286 B2* | 12/2023 | Watanabe | H05H 1/2439 |
| 11,840,288 B2* | 12/2023 | Watanabe | B60C 19/00 |
| 11,897,548 B2* | 2/2024 | Watanabe | B62D 35/02 |
| 11,993,321 B2* | 5/2024 | Watanabe | B62D 35/02 |
| 2015/0284072 A1 | 10/2015 | Minick et al. | |
| 2017/0297634 A1* | 10/2017 | Han | H05H 1/2439 |
| 2019/0342985 A1* | 11/2019 | Dadheech | H05H 1/2439 |
| 2021/0094630 A1* | 4/2021 | Watanabe | B62D 35/00 |
| 2021/0355923 A1* | 11/2021 | Niwa | H04N 23/50 |

FOREIGN PATENT DOCUMENTS

| | | |
|---|---|---|
| KR | 101396209 | 5/2014 |
| KR | 101575374 | 12/2015 |

OTHER PUBLICATIONS

Scinews, The First Aeroplane Propelled by Ionic Wind, YouTube Video, available at URL: https://www.youtube.com/watch?v=a9yYu-ZM1S0.

* cited by examiner

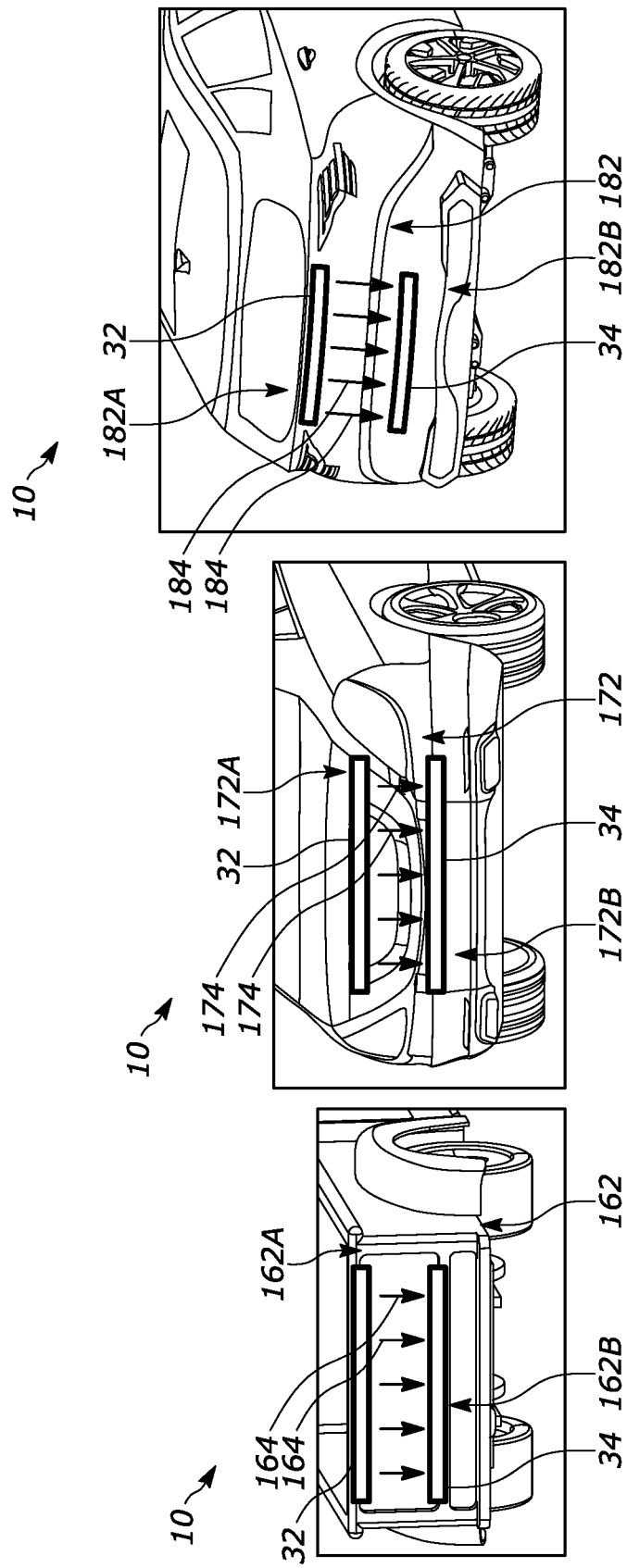

ACTIVE IONIC PROPULSION SYSTEM FOR MOTOR VEHICLES

FIELD

The present disclosure relates to aerodynamics, and more specifically to systems for controlling the airflow over surfaces of motor vehicles for improved aerodynamic performance.

BACKGROUND

The statements in this section merely provide background information related to the present disclosure and may not constitute prior art.

Motor vehicle manufacturers are constantly improving the fuel economy, battery range, and/or other performance characteristics of their vehicle offerings. As an example, motor vehicle manufacturers have employed systems that adjust the geometry and physical characteristics of various external components to improve aerodynamics, thereby improving fuel economy, battery range, and/or performance characteristics such as acceleration and handling. As another example, motor vehicle manufacturers have implemented various composite and advanced metal materials to reduce the weight of the motor vehicle, which also improves fuel economy, battery range, and other performance characteristics. However, challenges remain in the implementation of advanced materials and controls to meet the ever increasing demand for improved fuel economy, battery range, and overall vehicle performance.

These issues with improving the fuel economy, battery range, and/or performance characteristics of the motor vehicle, among other issues, are addressed by the present disclosure.

SUMMARY

This section provides a general summary of the disclosure and is not a comprehensive disclosure of its full scope or all of its features.

The present disclosure provides an ionic airflow management system for a motor vehicle. The ionic airflow management system includes a controller, a power supply in communication with the controller, at least one exterior component of a motor vehicle having an integral electrode in electrical communication with the power supply, the integral electrode comprising a cathodic terminal portion and an anodic terminal portion oriented relative to a managed airflow vector, and at least one sensor in communication with the controller, the at least one sensor including a speed sensor. The power supply receives signals from the controller to supply a predetermined amount of electrical power to the integral electrode based on a threshold speed detected by the speed sensor in an active mode, thereby controlling a speed and direction of airflow between the cathodic terminal portion and the anodic terminal portion. The power supply receives signals from the controller to switch off electrical power to the integral electrode below the threshold speed in an inactive mode.

In one form, the at least one exterior component comprises a front fascia and the cathodic terminal portion is disposed along a lower portion of the front fascia and the anodic terminal portion is disposed along an upper portion of the front fascia, thereby generating an upward flow of air along the managed airflow vector.

In one variation, the at least one exterior component comprises a splitter and the cathodic terminal portion is disposed along a leading edge of the splitter and the anodic terminal portion is disposed along a trailing edge of the splitter, wherein the controller communicates with the power supply to control an amount of downforce on the splitter.

In one form, the at least one exterior component comprises a rear fascia and the cathodic terminal portion is disposed along a lower portion of the rear fascia and the anodic terminal portion is disposed along an upper portion of the rear fascia, thereby generating an upward flow of air along the managed airflow vector.

In one variation, the at least one exterior component comprises a rear diffuser and the cathodic terminal portion is disposed along a portion of an underbody of the motor vehicle and the anodic terminal portion is disposed along a trailing edge of the rear diffuser, wherein the controller communicates with the power supply to control an amount of downforce on the rear diffuser.

In one form, the at least one exterior component comprises a rear diffuser and the cathodic terminal portion is disposed along a rear decklid or a trailing edge of a roof of the motor vehicle and the anodic terminal portion is disposed along a trailing edge of the rear diffuser, wherein the controller communicates with the power supply to control an amount of downforce on the rear diffuser.

In one variation, the at least one exterior component comprises an underbody of the motor vehicle and the cathodic terminal portion is disposed along a forward portion of the underbody and the anodic terminal portion is disposed along a rear portion of the underbody, wherein the controller communicates with the power supply to control an amount of downforce on the underbody.

In one form, the at least one exterior component comprises one of a tailgate, a liftgate, or a decklid and the cathodic terminal portion is disposed along an upper portion of the tailgate, liftgate, or decklid and the anodic terminal portion is disposed along a lower portion of the tailgate, liftgate, or decklid, thereby generating a downward flow of air along the managed airflow vector.

In one variation, the at least one exterior component comprises a wheel house liner and the cathodic terminal portion is disposed along a lower portion of the wheel house liner and the anodic terminal portion is disposed along an upper portion of the wheel house liner, thereby generating an upward flow of air along the managed airflow vector.

In one form, the at least one exterior component comprises a mud flap and the cathodic terminal portion is disposed along an upper portion of the mud flap and the anodic terminal portion is disposed along a lower portion of the mud flap, thereby generating a downward flow of air along the managed airflow vector.

In one variation, the ionic airflow management system includes a supplemental anodic terminal portion, wherein the at least one exterior component comprises a grill and the cathodic terminal portion is disposed along the grill, the anodic terminal portion is disposed along a proximal component of the motor vehicle, and the supplemental anodic terminal portion is disposed along a distal component of the motor vehicle, thereby selectively generating both a proximal and a distal flow of air along the managed airflow vector.

In one form, the at least one exterior component comprises a grill and the cathodic terminal portion is disposed along a forward fascia of the motor vehicle, the anodic terminal portion is disposed along the grill, thereby generating a distal flow of air along the managed airflow vector.

In one variation, the at least one exterior component comprises a grill and the cathodic terminal portion is disposed along the grill, the anodic terminal portion is disposed along a radiator of the motor vehicle, thereby generating a distal flow of air along the managed airflow vector.

In one form, the at least one exterior component comprises a side view mirror and the cathodic terminal portion is disposed along a forward portion of the side view mirror, the anodic terminal portion is disposed along a rear portion of the side view mirror, thereby generating a distal flow of air along the managed airflow vector.

In one variation, the at least one exterior component comprises a moon roof and the cathodic terminal portion is disposed along a leading edge portion of the moon roof, the anodic terminal portion is disposed along a trailing edge portion of the moon roof, thereby generating a distal flow of air along the managed airflow vector.

In one form, the at least one exterior component comprises rear doors of a tractor trailer and the cathodic terminal portion is disposed along an upper portion of the rear doors and the anodic terminal portion is disposed along a lower portion of the rear doors, thereby generating a downward flow of air along the managed airflow vector.

In one variation, ionic airflow management system includes electroluminescent strips of material disposed on the at least one exterior component of the motor vehicle, wherein the integral electrode is secured to electroluminescent strips of material.

In one form, the integral electrode comprises one of shape memory alloys, electrically conductive inks, electrically conductive paints, electrically conductive coatings, and electrically conductive tapes.

In one variation, the controller is configured to control, via a plurality of electromechanical actuators, a spacing between the cathodic terminal portion and the anodic terminal portion based on a mode of the motor vehicle, and the mode is one of the active mode and the inactive mode.

In one form, the cathodic terminal portion includes a plurality of cathodic terminal portion zones, the anodic terminal portion includes a plurality of anodic terminal portion zones, and the controller is configured to control the spacing between the cathodic terminal portion and the anodic terminal portion by independently adjusting at least one of a position and an orientation of the plurality of cathodic terminal portion zones and the plurality of anodic terminal portion zones.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 8 is an enlarged perspective view of an integral electrode disposed along one of a tailgate of a motor vehicle in accordance with the teachings of the present disclosure;

FIG. 9 is an enlarged perspective view of an integral electrode disposed along a liftgate or a decklid of a motor vehicle in accordance with the teachings of the present disclosure;

FIG. 10 is an enlarged perspective view of an integral electrode disposed along a liftgate or a decklid of the motor vehicle in accordance with the teachings of the present disclosure;

Figure 19:
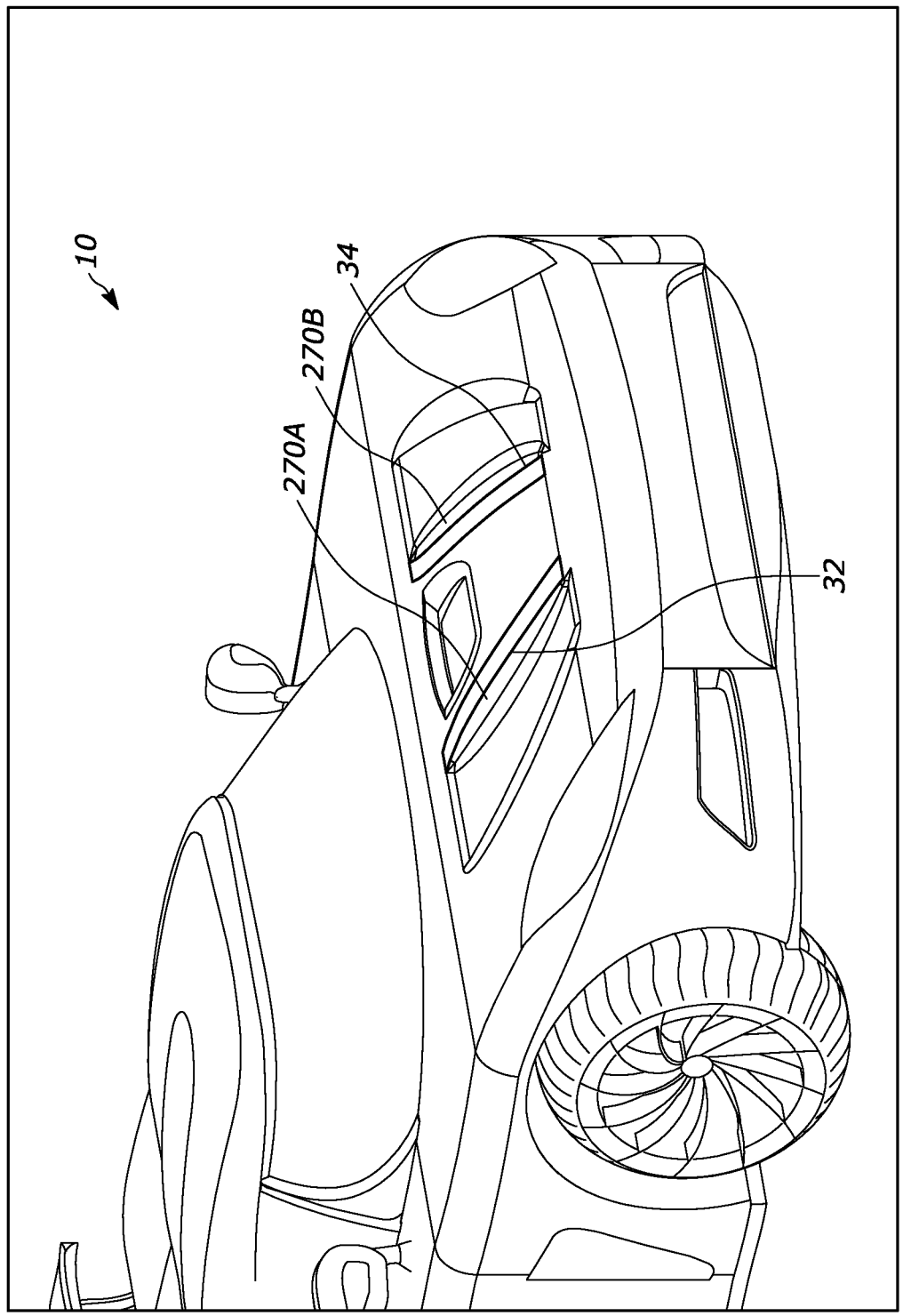
Figure 20:
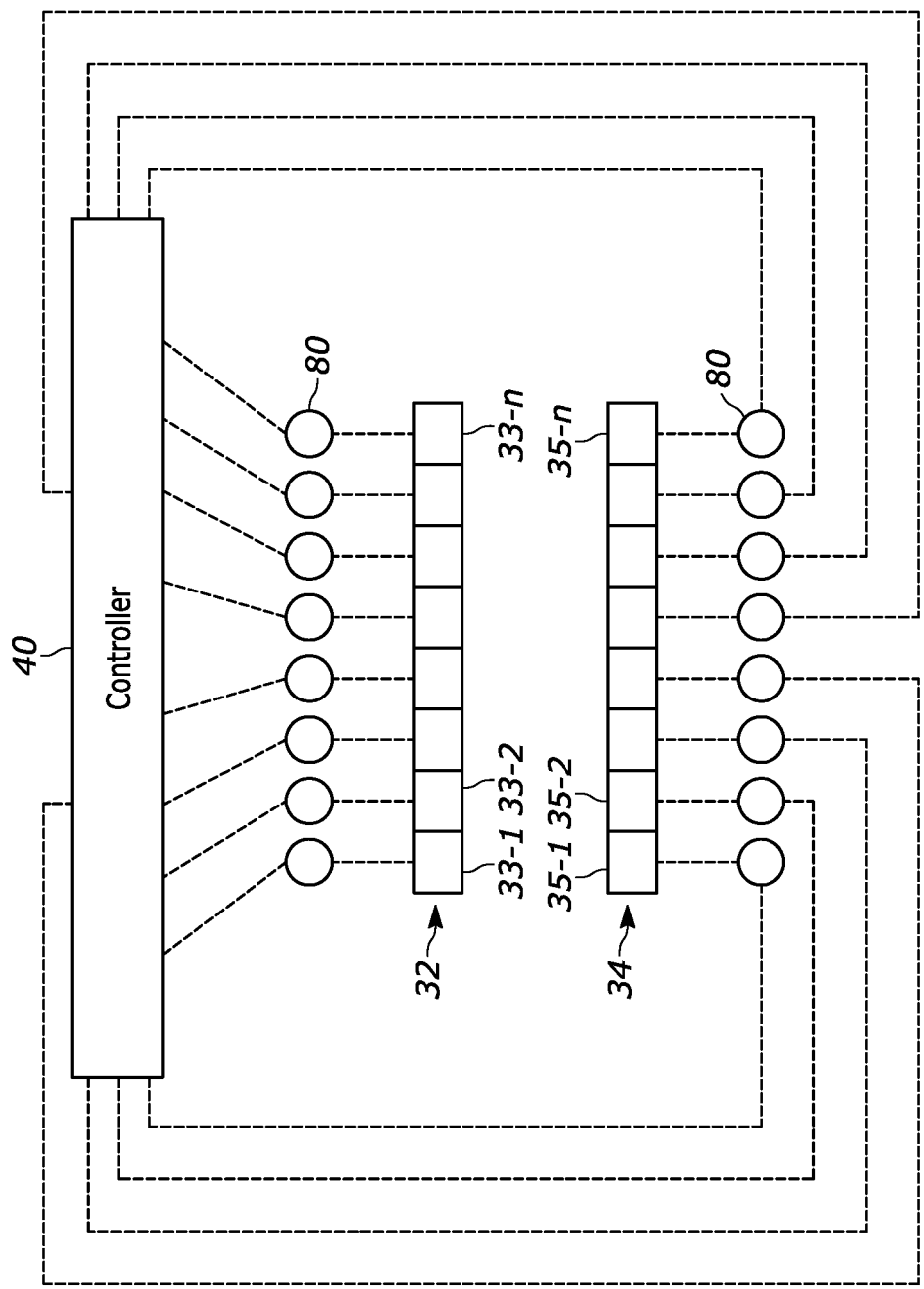

FIG. 19 is an enlarged perspective view of an integral electrode secured to electroluminescent strips of material disposed on at least one exterior component of a motor vehicle in accordance with the teachings of the present disclosure; and FIG. 20 is a functional block diagram of a controller and a plurality of electromechanical actuators configured to dynamically vary a spacing between an anodic terminal portion and a cathodic terminal portion of an integral electrode in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As set forth in greater detail below, the present disclosure provides an ionic airflow management system that actively manages and directs airflow proximate a motor vehicle (e.g., underneath the motor vehicle, the front or rear of the motor vehicle, wheel wells of the motor vehicle, among other areas proximate the motor vehicle). By managing and directing airflow proximate the motor vehicle, the ionic airflow management system inhibits drag and lift, improves fuel efficiency and/or a battery range of the motor vehicle, and/or selectively directs airflow into particular areas of the motor vehicle to improve various performance characteristics of the motor vehicle (e.g., the ionic airflow management system directs airflow into heat exchangers/radiators of the motor vehicle to improve heat transfer efficiency).

Specifically, the ionic airflow management system includes an electrode that is integral with an exterior component of the motor vehicle. The electrode includes a cathodic terminal portion and an anodic terminal portion that are selectively disposed along various external components of the motor vehicle. In response to the integral electrode receiving electrical power from a power supply, the ionic airflow management system ionizes molecules in the air proximate the motor vehicle, thereby producing an accelerated flow of air between the cathodic and anodic terminal portions. In other words, an ionic wind is formed when air ions accelerated by the applied electrical power, or electric field, exchange momentum with neutral atoms and molecules in the air, causing airflow. Relative to the electrode, the term "integral" as used herein should be construed to mean that the electrode can be secured to an exterior surface of the component, embedded within, or secured to an interior surface, or combinations thereof while remaining within the scope of the present disclosure.

As used herein, the phrase "motor vehicle" refers to every description of carriage or other contrivance propelled or drawn by mechanical power and used for commercial purposes on the highways in the transportation of passengers, passengers and property, or property or cargo. While the present disclosure describes the electrodes as being integral with an exterior component of the motor vehicle, it should be understood that the electrode (or one of the cathodic terminal portion and the anodic terminal portion) may be integral with an interior component of the motor vehicle.

Figure 1:
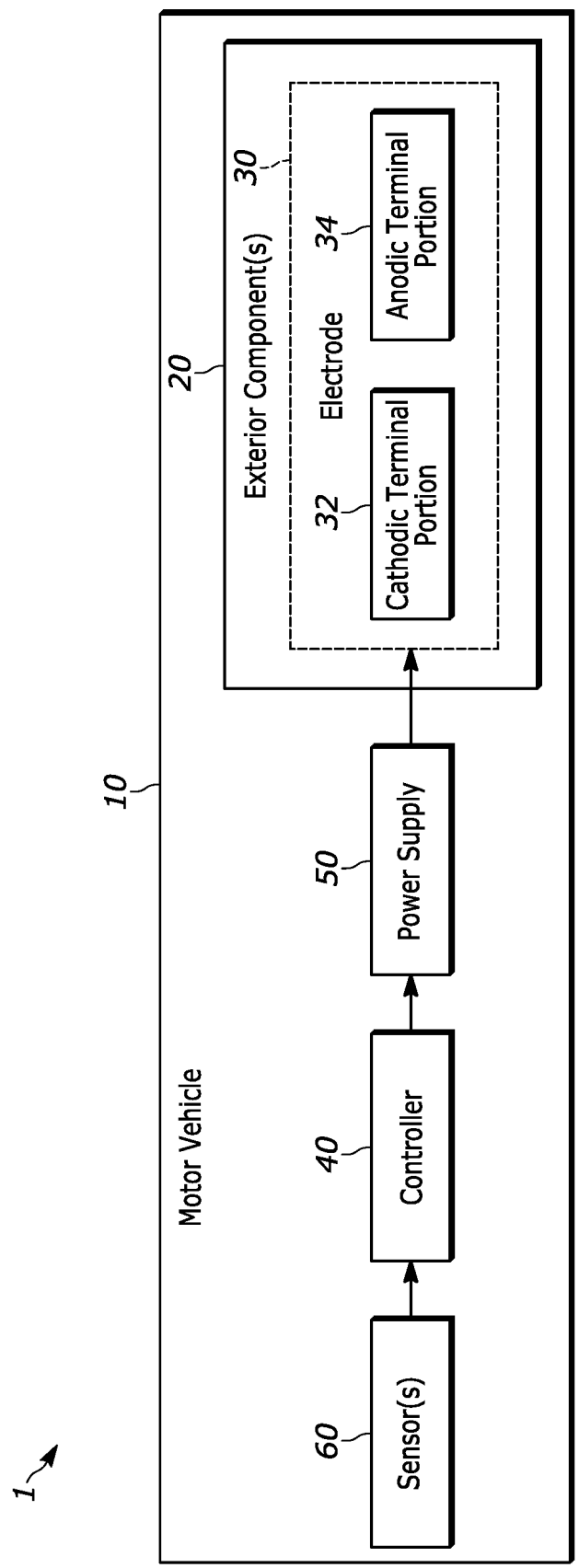
FIG. 1 is a functional block diagram of a vehicle having an ionic airflow management system in accordance with the teachings of the present disclosure.

Referring to FIG. 1, an ionic airflow management system 1 for a motor vehicle 10 is shown and includes at least one exterior component 20 having an integral electrode 30, a controller 40, a power supply 50, and at least one sensor 60. It should be understood that the motor vehicle may include other components not illustrated herein, such as an ignition system, a transmission system, a braking system, a fuel system and fuel tank, an electric motor and one or more electric batteries, among others, while remaining within the scope of the present disclosure. In one form, the integral electrode 30, the controller 40, the power supply 50, and/or the at least one sensor 60 are coupled via known motor vehicle communication and electrical networks, such as a controlled area network (CAN), a local interconnect network (LIN), and/or other suitable motor vehicle networks. Further, the power supply 50 may include digital and/or analog electronics while remaining within the scope of the present disclosure.

The integral electrode 30 is in electrical communication with the power supply 50 and may be any of a variety of conductive materials and/or structures. For example, the integral electrode 30 includes at least one of a shape memory alloy (i.e., an alloy that is deformable below a threshold temperature but reverts to a nominal shape when greater than the threshold temperature), an electrically conductive ink, an electrically conductive paint, an electrically conductive coating, an electrically conductive tape, and an electrically conductive polymer (e.g., polyetheretherketone (PEEK), electrically conductive polyethylene, electrically conductive polypropylene, electrically conductive polymers that are injection molded, among others). In other variations, the electrically conductive coating is a transparent/opaque layer that coats the electrically conductive ink, an electrically conductive paint, and/or an electrically conductive tape. In one form, the integral electrode 30 includes metallic components or overlaying plastics with metal paneling. In another form, the integral electrode 30 includes a thermoset or a composite material (e.g., aluminized fiberglass) having electrically conductive fillers and resins (e.g., carbon nanotubes, aluminum, nickel, copper, silver, metallized glass, and Terfenol-D, among others). These and other conductive materials for use as an integral electrode 30 according to the teachings herein should be construed as falling within the scope of the present disclosure.

As shown, the integral electrode 30 includes a cathodic terminal portion 32 and an anodic terminal portion 34. As illustrated in detail below, both the cathodic terminal portion 32 and the anodic terminal portion 34 are oriented relative to a managed airflow vector. As used herein, the phrase "managed airflow vector" should be construed to mean to an airflow proximate the exterior component 20 of the motor vehicle 10 that has a controllable magnitude (e.g., mass flow rate), airspeed (i.e., velocity), and direction(s) (e.g., one or more one-dimensional, two-dimensional, or three-dimensional vectors). In one form, the magnitude, airspeed, and direction of the airflow is controlled based on the amount, polarity, magnitude (e.g., peak or average value), duty cycle, and/or other parameters of the electrical power output by the power supply 50 and as determined by the controller 40. As a specific example, the cathodic terminal portion 32 and the anodic terminal portion 34 are oriented relative to the managed airflow vector such that when electric power is provided to the integral electrode 30, the managed airflow vector has a magnitude, airspeed, and direction that causes one or more clusters of ions to accelerate between the air gap, or space, between the cathodic terminal portion 32 and the anodic terminal portion 34. Accordingly, the cathodic terminal portion 32 and the anodic terminal portion 34 may be configured with different shapes and different spacing therebetween as a function of how much the airflow is to be altered with the ions. In yet another form of the present disclosure, the spacing between the cathodic terminal portion 32 and the anodic terminal portion 34 may be dynamically variable as a function of driving conditions. Such dynamically variable spacing between the cathodic terminal portion 32 and the anodic terminal portion 34 can be accomplished via electromechanical actuators, a controller, and various sensors, as set forth in greater detail below. Additional details and examples of the managed airflow vector are described below with reference to FIGS. 2-20.

In one form, the at least one sensor 60 includes a speed sensor that obtains speed data of the motor vehicle 10. The controller 40 determines a speed and mode of the motor vehicle 10 based on the speed data and selectively provides signals to the power supply 50 based on the determined speed and mode to thereby control the characteristics of the electrical power output by power supply 50 to the integral electrode 30. As an example, when the speed of the motor vehicle 10 is greater than a threshold speed (e.g., 20 mph), the controller 40 determines that the motor vehicle 10 is in an active mode and instructs the power supply 50 to supply a predetermined amount of electrical power (e.g., a predetermined voltage and current) to the integral electrode 30. As another example, when the speed of the motor vehicle 10 is lower than a threshold speed, the controller 40 determines the motor vehicle 10 is in the inactive mode and instructs the power supply 50 to switch off electrical power (i.e., discontinue providing electrical power) to the integral electrode 30.

Accordingly, by selectively applying electrical power to the integral electrode 30 based on the speed of the motor vehicle 10, the controller 40 enables other motor vehicle components (e.g., an alternator) to generate sufficient electrical power to offset the electrical demand that results from the supply of electrical power to the integral electrode 30. Furthermore, by selectively controlling amount of electrical power provided to the integral electrode 30, the ionic airflow management system 1 inhibits turbulence, drag, and/or lift of the motor vehicle 10 and thereby improves the fuel economy/battery range of the motor vehicle 10, as described below in further detail.

To perform the functionality described herein, the controller 40 may include one or more processor circuits configured to execute instructions stored on a nontransitory computer-readable medium, such as a read-only memory (ROM) and/or a random-access memory (RAM). Furthermore, to perform the functionality described herein, the power supply 50 may include a direct current (DC) source (e.g., one or more batteries), an alternating current (AC) source (e.g., an inverter), and/or a dual plasma power supply. Additionally, the power supply 50 may include various known power converter circuits for controlling the electrical power output by the power supply 50, such as a half-bridge amplifier, a Class D amplifier, a Class E amplifier, boost and/or buck converters, among other power converter circuits.

In one form, the at least one exterior component 20 may be provided by any number and/or types of exterior components of the motor vehicle 10. Examples of the at least one exterior component 20 of the motor vehicle 10 are provided below with reference to FIGS. 2-19. The cathodic terminal portion 32 and the anodic terminal portion 34 are integral with the at least one exterior component 20, as described above.

Figure 2:
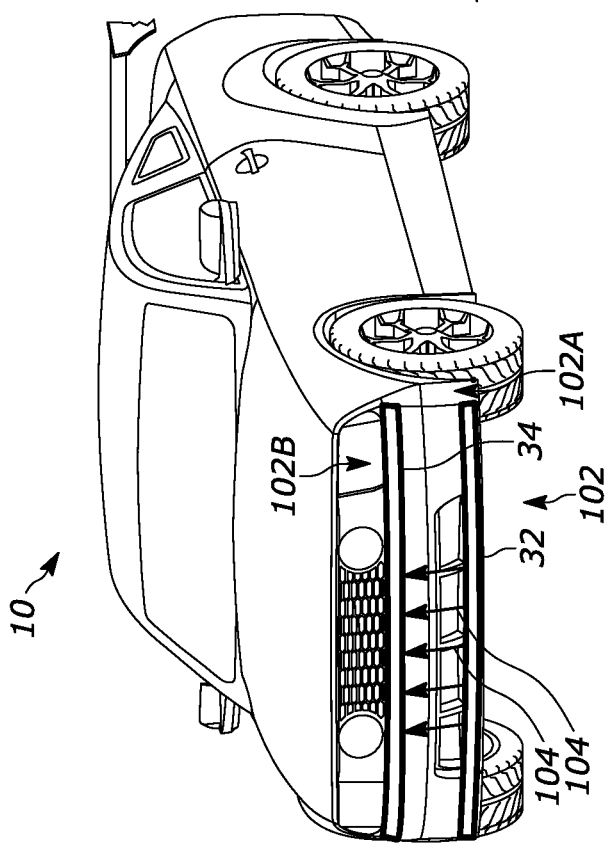
FIG. 2 is a perspective view of a motor vehicle having an integral electrode disposed along a front fascia in accordance with the teachings of the present disclosure.

As an example and as shown in FIG. 2, the at least one exterior component 20 is provided by a front fascia 102 of the motor vehicle 10. The cathodic terminal portion 32 is disposed along a lower portion 102A of the front fascia 102, and the anodic terminal portion 34 is disposed along an upper portion 102B of the front fascia 102. As described above, the power supply 50 provides the predetermined electrical power to the integral electrode 30 when the controller 40 determines the motor vehicle 10 is operating in the active mode. Accordingly, in response to the integral electrode 30 receiving the electrical power from the power supply 50, the integral electrode 30 ionizes molecules in the air proximate the cathodic terminal portion 32 and the anodic terminal portion 34 (i.e., the front fascia 102), thereby generating an upward flow of air along the managed airflow vectors, as indicated by arrows 104. Accordingly, the ionic airflow management system 1 inhibits the amount of air that is directed under the motor vehicle 10, thereby inhibiting drag and lift and improving the fuel economy/battery range of the motor vehicle 10.

Figure 3:
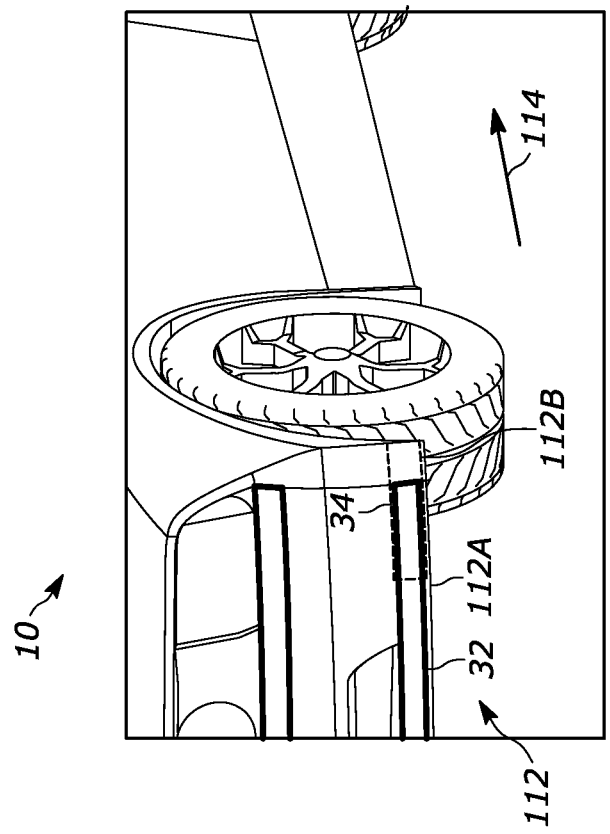
FIG. 3 is an enlarged perspective view of an integral electrode disposed along a splitter of a motor vehicle in accordance with the teachings of the present disclosure.

As another example and as shown in FIG. 3, the at least one exterior component 20 is provided by a splitter 112 of the motor vehicle 10. The cathodic terminal portion 32 is disposed along a leading edge 112A of the splitter 112, and the anodic terminal portion 34 is disposed along a trailing edge 112B of the splitter 112. In response to the motor vehicle 10 being in the active mode and the integral electrode 30 receiving the electrical power from the power supply 50, the integral electrode 30 ionizes molecules in the air proximate the cathodic terminal portion 32 and the anodic terminal portion 34 (i.e., the splitter 112), thereby generating a flow of air along the managed airflow vector, as indicated by arrow 114. Furthermore, the controller 40 may control the amount of electrical power output by the power supply 50 to control an amount of downforce on the splitter 112. Accordingly, the ionic airflow management system 1 decreases an overhang of the splitter 112 and thereby inhibits the drag and lift of the motor vehicle 10 while improving the fuel economy/battery range of the motor vehicle 10.

Figure 4:
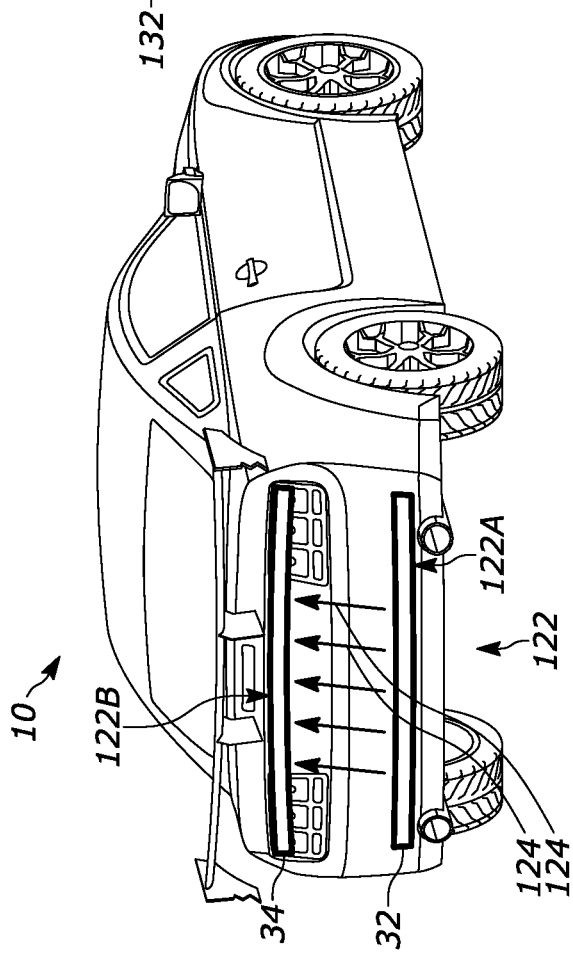
FIG. 4 is a perspective view of a motor vehicle with an integral electrode disposed along a rear fascia in accordance with the teachings of the present disclosure.

In another example and as shown in FIG. 4, the at least one exterior component 20 is provided by a rear fascia 122 of the motor vehicle 10. The cathodic terminal portion 32 is disposed along a lower portion 122A of the rear fascia 122, and the anodic terminal portion 34 is disposed along an upper portion 122B of the rear fascia 122. In response to the motor vehicle 10 being in the active mode and the integral electrode 30 receiving the electrical power from the power supply 50, the integral electrode 30 ionizes molecules in the air proximate the cathodic terminal portion 32 and the anodic terminal portion 34 (i.e., the rear fascia 122), thereby generating an upward flow of air along the managed airflow vector, as indicated by arrow 124. Accordingly, the ionic airflow management system 1 inhibits the amount of air that is directed under the motor vehicle 10, thereby inhibiting drag and lift and improving the fuel economy/battery range of the motor vehicle 10.

Figure 5:
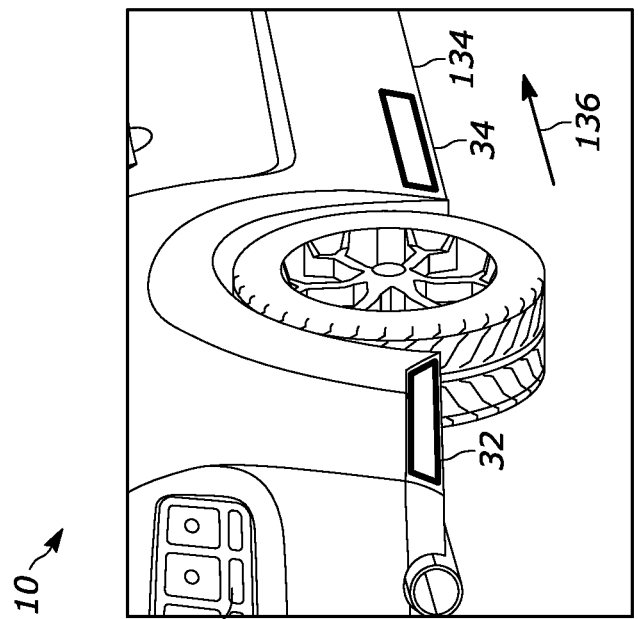
FIG. 5 is an enlarged perspective view of an integral electrode disposed along a rear diffuser and an underbody of a motor vehicle in accordance with the teachings of the present disclosure.

In a further example and as shown in FIG. 5, the at least one exterior component 20 is provided by a rear diffuser 132 and an underbody 134 of the motor vehicle 10. The cathodic terminal portion 32 is disposed along a portion 134A of the underbody 134, and the anodic terminal portion 34 is disposed along a trailing edge 132A of the rear diffuser 132. In response to the motor vehicle 10 being in the active mode and the integral electrode 30 receiving the electrical power from the power supply 50, the integral electrode 30 ionizes molecules in the air proximate the cathodic terminal portion 32 and the anodic terminal portion 34 (i.e., the rear diffuser 132 and the underbody 134), thereby generating a flow of air along the managed airflow vector, as indicated by arrow 136. Furthermore, the controller 40 may control the amount of electrical power output by the power supply 50 to control an amount of downforce on the rear diffuser 132. Accordingly, the ionic airflow management system 1 enables the rear diffuser 132 to have an increased angle of attack (i.e., the angle in which the rear diffuser 132 is rotated relative to the direction of movement through the air) without laminar separation bubbles that may be typically provided to accommodate larger angles of attack.

Figure 6:
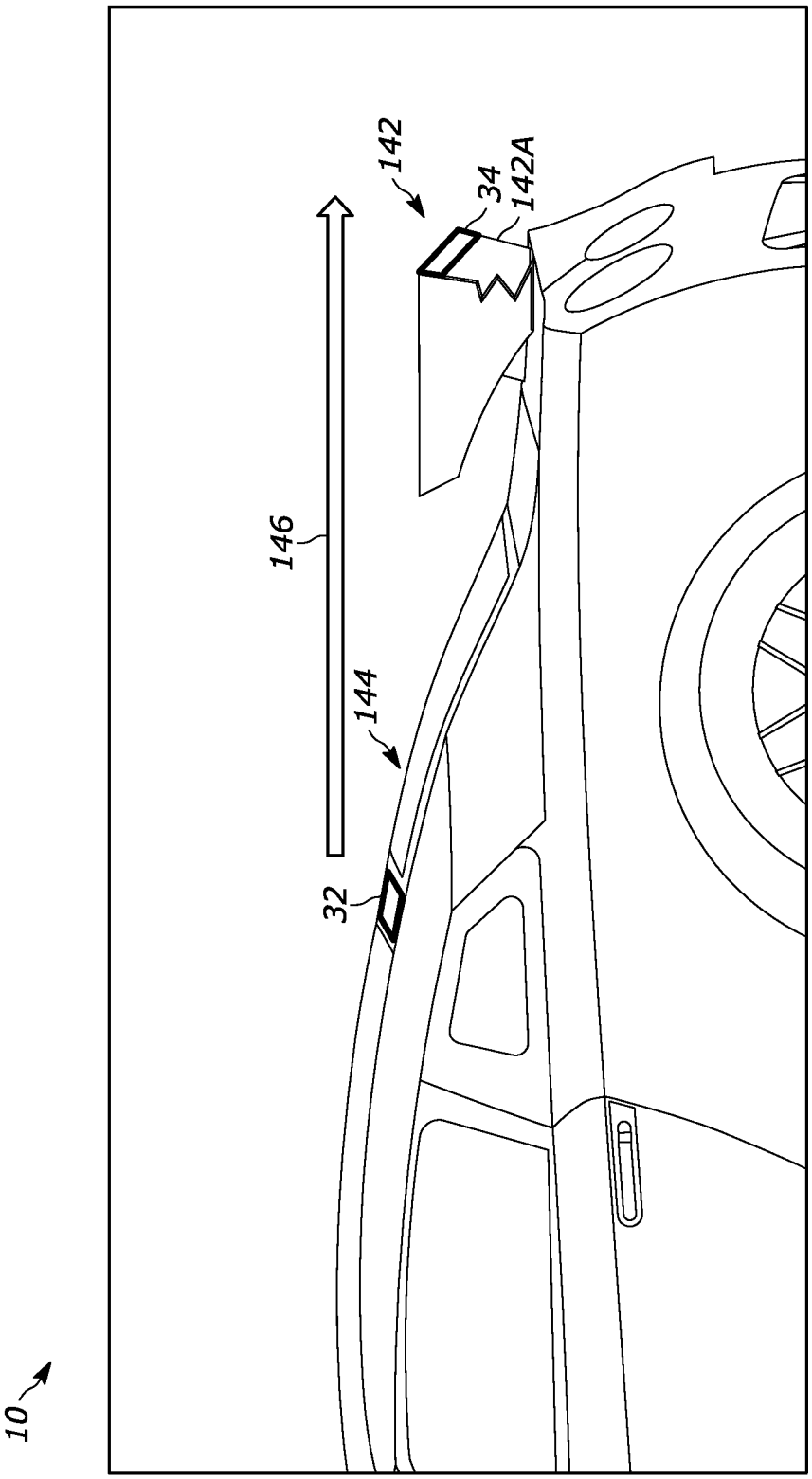
FIG. 6 is an enlarged side view of an integral electrode disposed along a rear diffuser and a rear decklid or trailing edge of a roof of a motor vehicle in accordance with the teachings of the present disclosure.

In yet another example and as shown in FIG. 6, the at least one exterior component 20 is provided by a rear diffuser 142 and a decklid 144 of the motor vehicle 10. The cathodic terminal portion 32 is disposed along the decklid 144, and the anodic terminal portion 34 is disposed along a trailing edge 142A of the rear diffuser 142.

In response to the motor vehicle 10 being in the active mode and the integral electrode 30 receiving the electrical power from the power supply 50, the integral electrode 30 ionizes molecules in the air proximate the cathodic terminal portion 32 and the anodic terminal portion 34 (i.e., the rear diffuser 142 and the decklid 144), thereby generating a flow of air along the managed airflow vector, as indicated by arrow 146. Furthermore, the controller 40 may control the amount of electrical power output by the power supply 50 to control an amount of downforce on the rear diffuser 142. Accordingly, the ionic airflow management system 1 enables the rear diffuser 142 to acquire a negative charge and therefore have a lower angle of attack to produce a given level of downforce.

Figure 7:
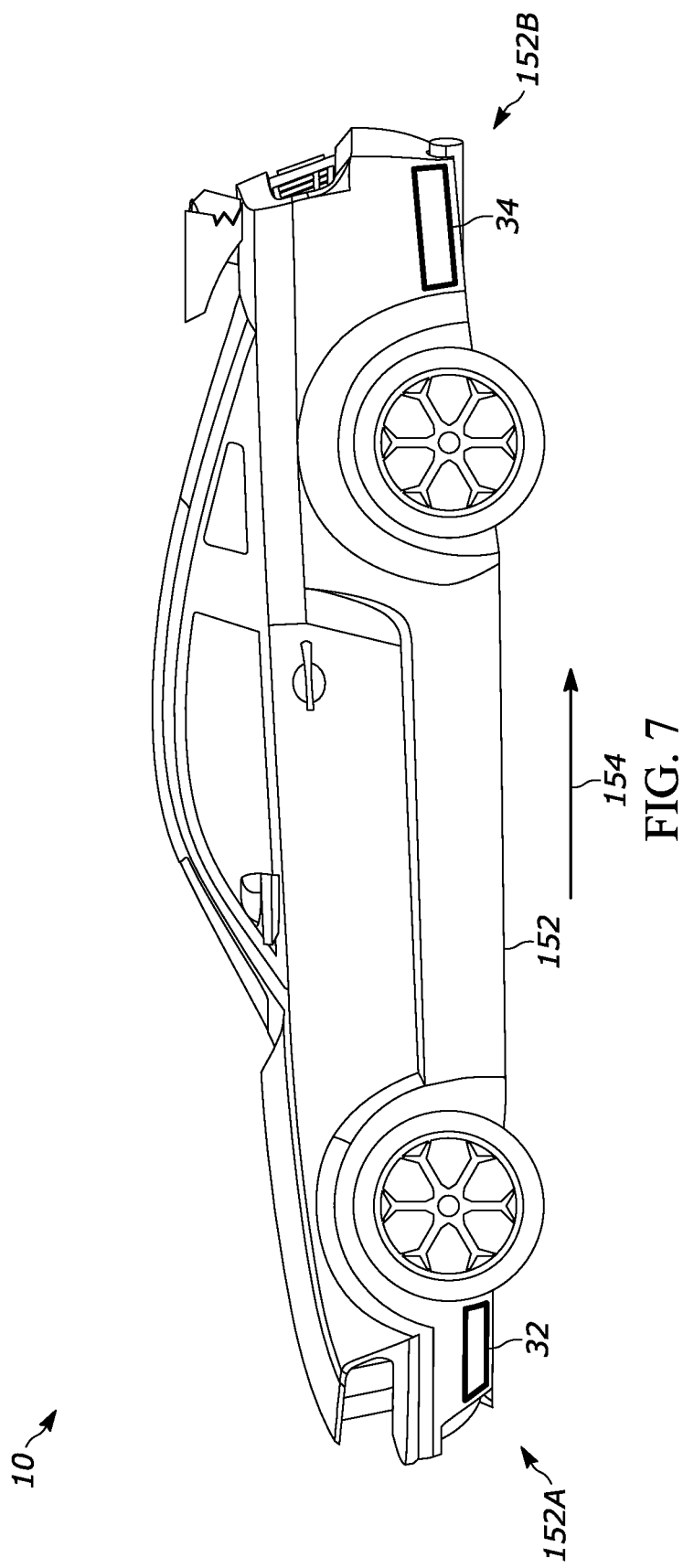
FIG. 7 is an enlarged front view of an integral electrode disposed along an underbody of a motor vehicle in accordance with the teachings of the present disclosure.

In one example and as shown in FIG. 7, the at least one exterior component 20 is provided by an underbody 152 of the motor vehicle 10. The cathodic terminal portion 32 is disposed along a forward portion 152A of the underbody 152, and the anodic terminal portion 34 is disposed along a rear portion 152B of the underbody 152. In response to the motor vehicle 10 being in the active mode and the integral electrode 30 receiving the electrical power from the power supply 50, the integral electrode 30 ionizes molecules in the air proximate the cathodic terminal portion 32 and the anodic terminal portion 34 (i.e., the underbody 152), thereby generating a flow of air along the managed airflow vector, as indicated by arrow 154. Furthermore, the controller 40 may control the amount of electrical power output by the power supply 50 to control an amount of downforce on the underbody 152. Accordingly, the ionic airflow management system 1 provides for increased air velocity during ionic propulsion, thereby decreasing the pressure and increasing the downforce.

As another example and as shown in FIG. 8, the at least one exterior component 20 is provided by a tailgate 162 of the motor vehicle 10. The cathodic terminal portion 32 is disposed along an upper portion 162A of the tailgate 162, and the anodic terminal portion 34 is disposed along a lower portion 162B of the tailgate 162. In response to the motor vehicle 10 being in the active mode and the integral electrode 30 receiving the electrical power from the power supply 50, the integral electrode 30 ionizes molecules in the air proximate the cathodic terminal portion 32 and the anodic terminal portion 34 (i.e., the tailgate 162), thereby generating a downward flow of air along the managed airflow vector, as indicated by arrows 164. Accordingly, the ionic airflow management system 1 inhibits the amount of air that is directed over the motor vehicle 10, thereby inhibiting drag and lift and improving the fuel economy/battery range of the motor vehicle 10.

As an additional example and as shown in FIG. 9, the at least one exterior component 20 is provided by a decklid 172 of the motor vehicle 10. The cathodic terminal portion 32 is disposed along an upper portion 172A of the decklid 172, and the anodic terminal portion 34 is disposed along a lower portion 172B of the decklid 172. In response to the motor vehicle 10 being in the active mode and the integral electrode 30 receiving the electrical power from the power supply 50, the integral electrode 30 ionizes molecules in the air proximate the cathodic terminal portion 32 and the anodic terminal portion 34 (i.e., the decklid 172), thereby generating a downward flow of air along the managed airflow vector, as indicated by arrows 174. Accordingly, the ionic airflow management system 1 inhibits the amount of air that is directed over the motor vehicle 10, thereby inhibiting drag and lift and improving the fuel economy/battery range of the motor vehicle 10.

In one example and as shown in FIG. 10, the at least one exterior component 20 is provided by a liftgate 182 of the motor vehicle 10. The cathodic terminal portion 32 is disposed along an upper portion 182A of the liftgate 182, and the anodic terminal portion 34 is disposed along a lower portion 182B of the liftgate 182. In response to the motor vehicle 10 being in the active mode and the integral electrode 30 receiving the electrical power from the power supply 50, the integral electrode 30 ionizes molecules in the air proximate the cathodic terminal portion 32 and the anodic terminal portion 34 (i.e., the liftgate 182), thereby generating a downward flow of air along the managed airflow vector, as indicated by arrows 184. Accordingly, the ionic airflow management system 1 inhibits the amount of air that is directed over the motor vehicle 10, thereby inhibiting drag and lift and improving the fuel economy/battery range of the motor vehicle 10.

Figure 11:
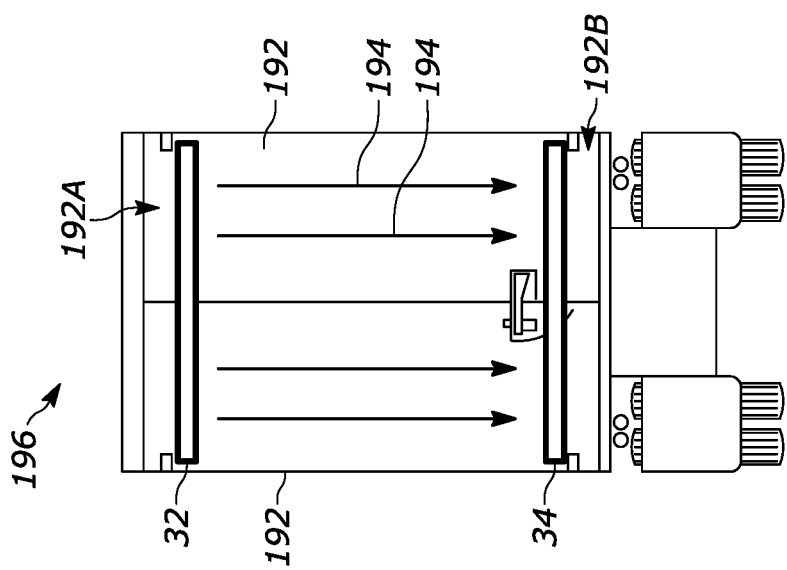
FIG. 11 is a rear view of an integral electrode disposed along rear doors of a tractor trailer in accordance with the teachings of the present disclosure.

In yet another example and as shown in FIG. 11, the at least one exterior component 20 is provided by rear doors 192 of a tractor trailer 196 (as the motor vehicle 10). The cathodic terminal portion 32 is disposed along an upper portion 192A of the rear doors 192, and the anodic terminal portion 34 is disposed along a lower portion 192B of the rear doors 192. In response to the tractor trailer 196 being in the active mode and the integral electrode 30 receiving the electrical power from the power supply 50, the integral electrode 30 ionizes molecules in the air proximate the cathodic terminal portion 32 and the anodic terminal portion 34 (i.e., the rear doors 192), thereby generating a downward flow of air along the managed airflow vector, as indicated by arrows 194. Accordingly, the ionic airflow management system 1 inhibits the amount of air that is directed over the tractor trailer 196, thereby inhibiting drag and lift and improving the fuel economy/battery range of the tractor trailer 196.

Figure 12:
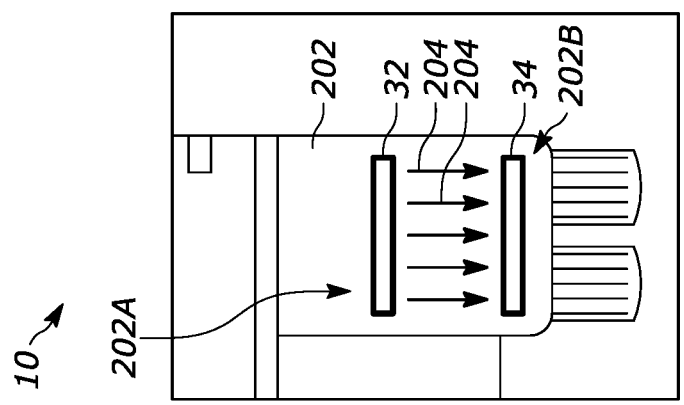
FIG. 12 is an enlarged rear view of an integral electrode disposed along a mud flap of a motor vehicle in accordance with the teachings of the present disclosure.

In one example and as shown in FIG. 12, the at least one exterior component 20 is provided by a mud flap 202 of the motor vehicle 10. The cathodic terminal portion 32 is disposed along an upper portion 202A of the mud flap 202, and the anodic terminal portion 34 is disposed along a lower portion 202B of the mud flap 202. In response to the motor vehicle 10 being in the active mode and the integral electrode 30 receiving the electrical power from the power supply 50, the integral electrode 30 ionizes molecules in the air proximate the cathodic terminal portion 32 and the anodic terminal portion 34 (i.e., the mud flap 202), thereby generating a downward flow of air along the managed airflow vector, as indicated by arrows 204. Accordingly, the ionic airflow management system 1 inhibits the amount of air that is directed over the motor vehicle 10, thereby inhibiting drag and lift and improving the fuel economy/battery range of the motor vehicle 10.

Figure 13:
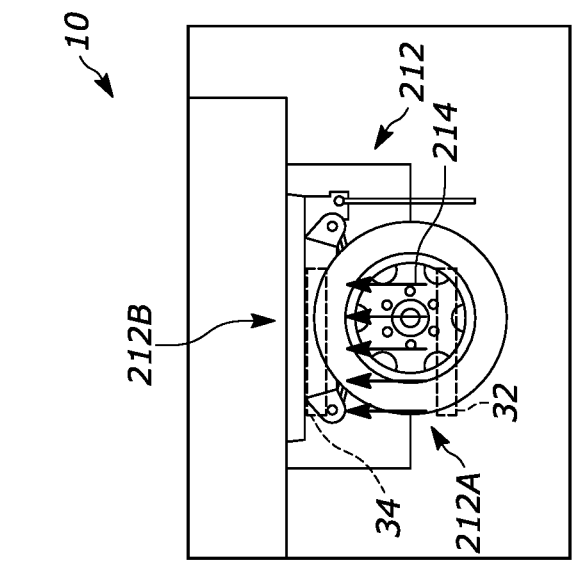
FIG. 13 is an enlarged side view of an integral electrode disposed along a wheel house liner of the motor vehicle in accordance with the teachings of the present disclosure.

As another example and as shown in FIG. 13, the at least one exterior component 20 is provided by a wheel house liner 212 of the motor vehicle 10. The cathodic terminal portion 32 is disposed along a lower portion 212A of the wheel house liner 212, and the anodic terminal portion 34 is disposed along an upper portion 212B of the wheel house liner 212. In response to the motor vehicle 10 being in the active mode and the integral electrode 30 receiving the electrical power from the power supply 50, the integral electrode 30 ionizes molecules in the air proximate the cathodic terminal portion 32 and the anodic terminal portion 34 (i.e., the wheel house liner 212), thereby generating an upward flow of air along the managed airflow vector, as indicated by arrow 214. Accordingly, the ionic airflow management system 1 inhibits the amount of air that is directed under the motor vehicle 10, thereby inhibiting drag and lift and improving the fuel economy/battery range of the motor vehicle 10.

Figure 14:
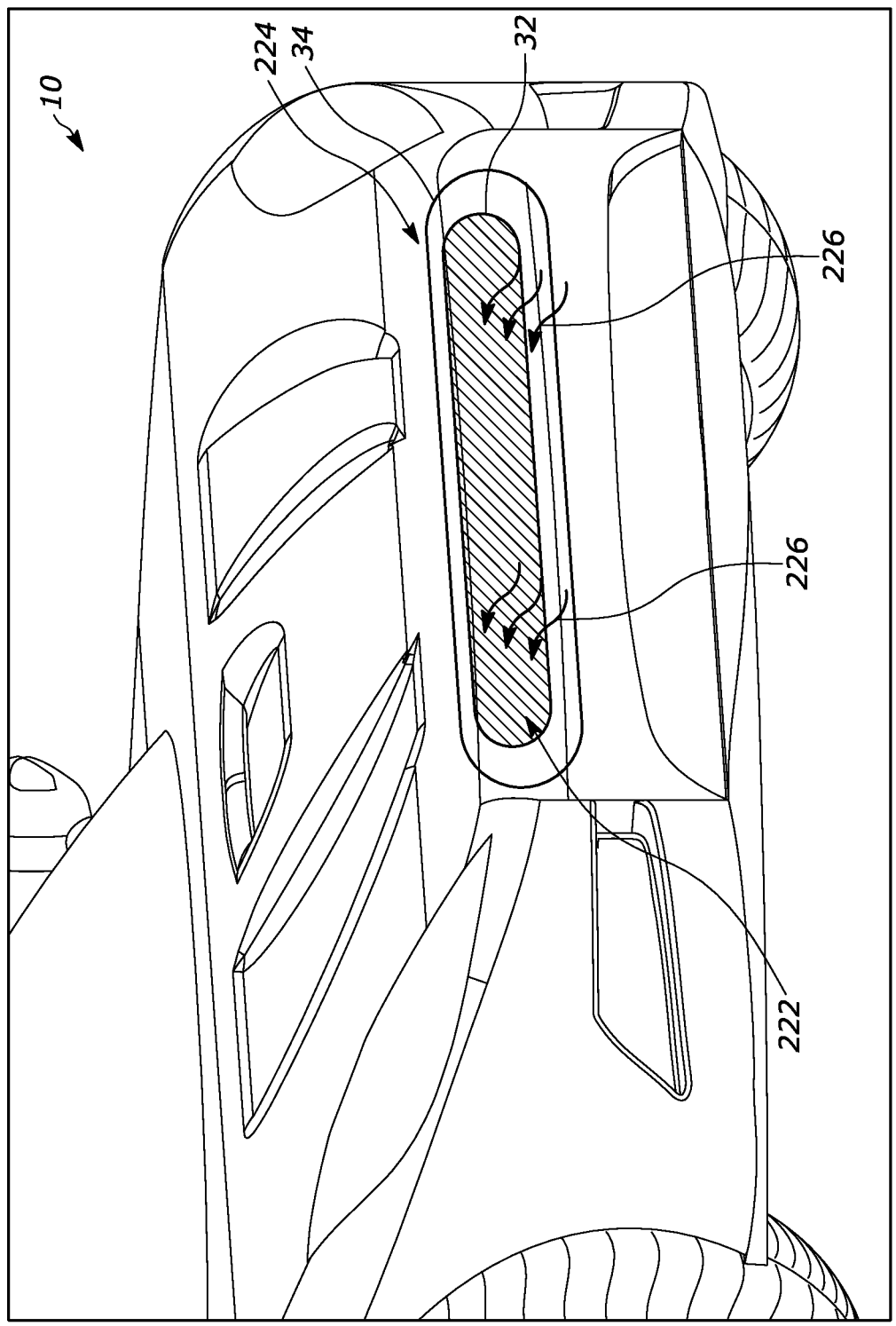
FIG. 14 is an enlarged perspective view of an integral electrode disposed along a grill and a front fascia of a motor vehicle in accordance with the teachings of the present disclosure.
Figure 15:
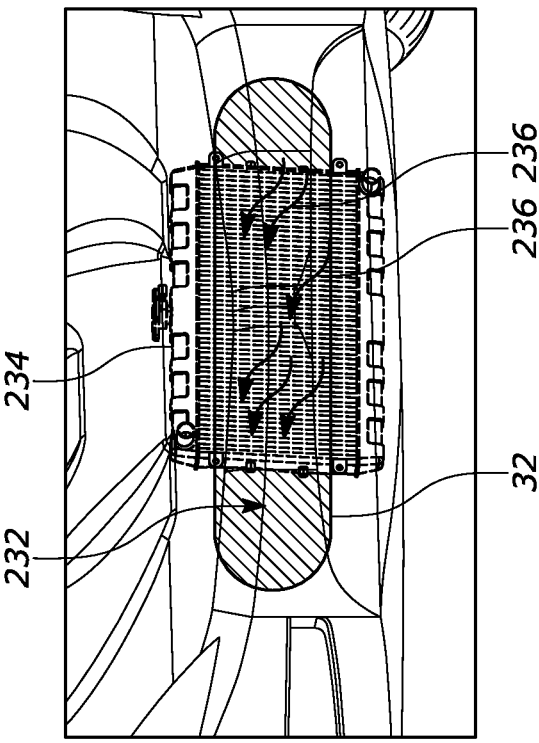
FIG. 15A is a perspective view of an integral electrode disposed along a grill and a radiator of a motor vehicle in accordance with the teachings of the present disclosure.
FIG. 15B is a perspective view of an integral electrode disposed along a grill and a radiator of a motor vehicle in accordance with the teachings of the present disclosure.
Figure 15:
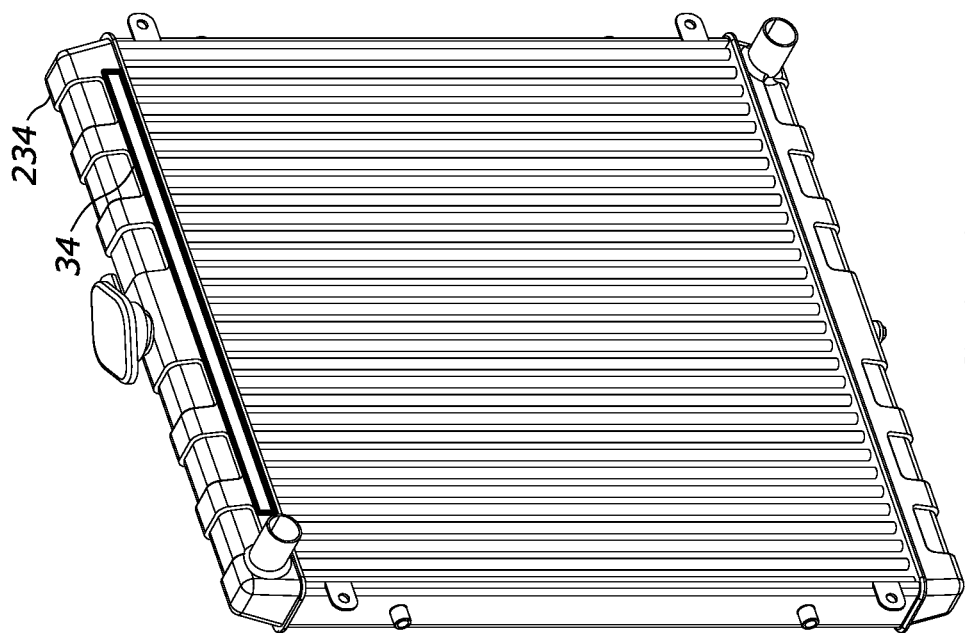

In a further example and as shown in FIG. 14, the at least one exterior component 20 is provided by a grill 222 and a forward fascia 224 of the motor vehicle 10. The cathodic terminal portion 32 is disposed along the forward fascia 224, and the anodic terminal portion 34 is disposed along the grill 222. In response to the motor vehicle 10 being in the active mode and the integral electrode 30 receiving the electrical power from the power supply 50, the integral electrode 30 ionizes molecules in the air proximate the cathodic terminal portion 32 and the anodic terminal portion 34 (i.e., the grill 222 and the forward fascia 224), thereby generating a distal flow of air along the managed airflow vector, as indicated by arrows 226. Accordingly, the ionic airflow management system 1 may direct air flow into the heat exchangers of the motor vehicle 10 without creating additional drag, thereby improving the performance characteristics of the motor vehicle 10.

In yet another example and as shown in FIGS. 15A-15B, the at least one exterior component 20 is provided by a grill 232 and a radiator 234 of the motor vehicle 10. The cathodic terminal portion 32 is disposed along the grill 232, and the anodic terminal portion 34 is disposed along the radiator 234. In response to the motor vehicle 10 being in the active mode and the integral electrode 30 receiving the electrical power from the power supply 50, the integral electrode 30 ionizes molecules in the air proximate the cathodic terminal portion 32 and the anodic terminal portion 34 (i.e., the grill 232 and the radiator 234), thereby generating a distal flow of air along the managed airflow vector, as indicated by arrow 236. Accordingly, the integration of the integral electrode 30 with the radiator 234 obviates the need for a dedicated radiator fan, thereby reducing accessory drive power consumption of the vehicle and improving the fuel economy/battery range of the motor vehicle 10.

Figure 16:
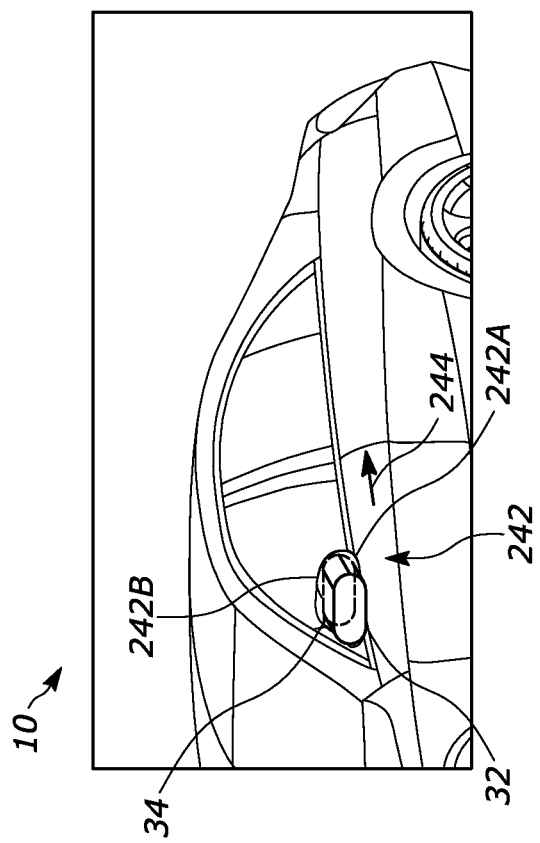
FIG. 16 is an enlarged perspective view of an integral electrode disposed along a side view mirror of a motor vehicle in accordance with the teachings of the present disclosure.

In one example and as shown in FIG. 16, the at least one exterior component 20 is provided by a sideview mirror 242 of the motor vehicle 10. The cathodic terminal portion 32 is disposed along a forward portion 242A of the sideview mirror 242, and the anodic terminal portion 34 is disposed along a rear portion 242B of the sideview mirror 242. In response to the motor vehicle 10 being in the active mode and the integral electrode 30 receiving the electrical power from the power supply 50, the integral electrode 30 ionizes molecules in the air proximate the cathodic terminal portion 32 and the anodic terminal portion 34 (i.e., the sideview mirror 242), thereby generating a distal flow of air along the managed airflow vector, as indicated by arrow 244. Accordingly, the ionic airflow management system 1 inhibits the amount of air that is directed on the sides of the motor vehicle 10, thereby inhibiting drag and lift and improving the fuel economy/battery range of the motor vehicle 10.

Figure 17:
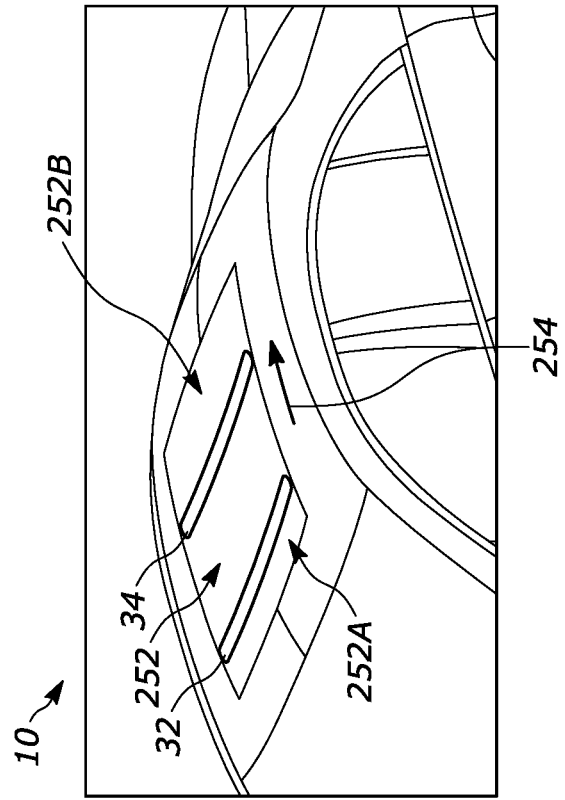
FIG. 17 is an enlarged perspective view of an integral electrode disposed along a moon roof of a motor vehicle in accordance with the teachings of the present disclosure.

As another example and as shown in FIG. 17, the at least one exterior component 20 is provided by a moon roof 252 of the motor vehicle 10. The cathodic terminal portion 32 is disposed along a leading edge portion 252A of the moon roof 252, and the anodic terminal portion 34 is disposed along a trailing edge portion 252B of the moon roof 252. In response to the motor vehicle 10 being in the active mode and the integral electrode 30 receiving the electrical power from the power supply 50, the integral electrode 30 ionizes molecules in the air proximate the cathodic terminal portion 32 and the anodic terminal portion 34 (i.e., the moon roof 252), thereby generating a distal flow of air along the managed airflow vector, as indicated by arrow 254. Accordingly, the ionic airflow management system 1 inhibits the amount of air that is directed over the motor vehicle 10, thereby inhibiting drag and lift and improving the fuel economy/battery range of the motor vehicle 10.

Figure 18A:
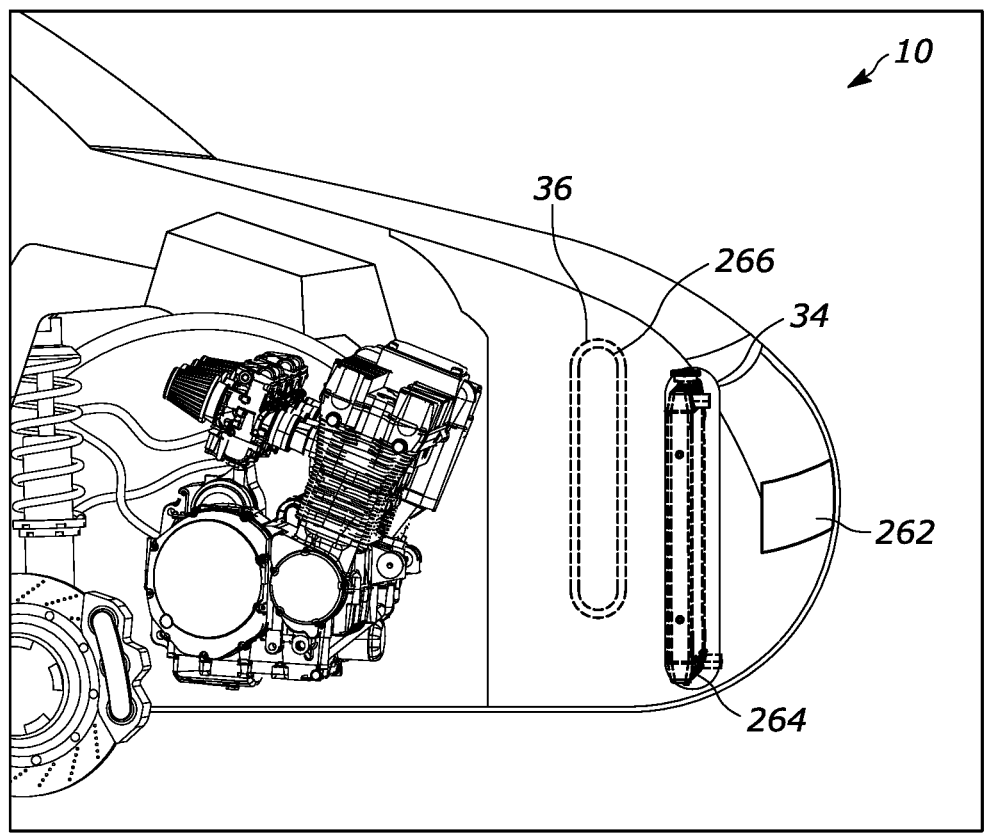
FIG. 18A is a partial cut-away perspective view of an integral electrode disposed along a grill, a proximal component, and a distal component of a motor vehicle in accordance with the teachings of the present disclosure.
Figure 18B:
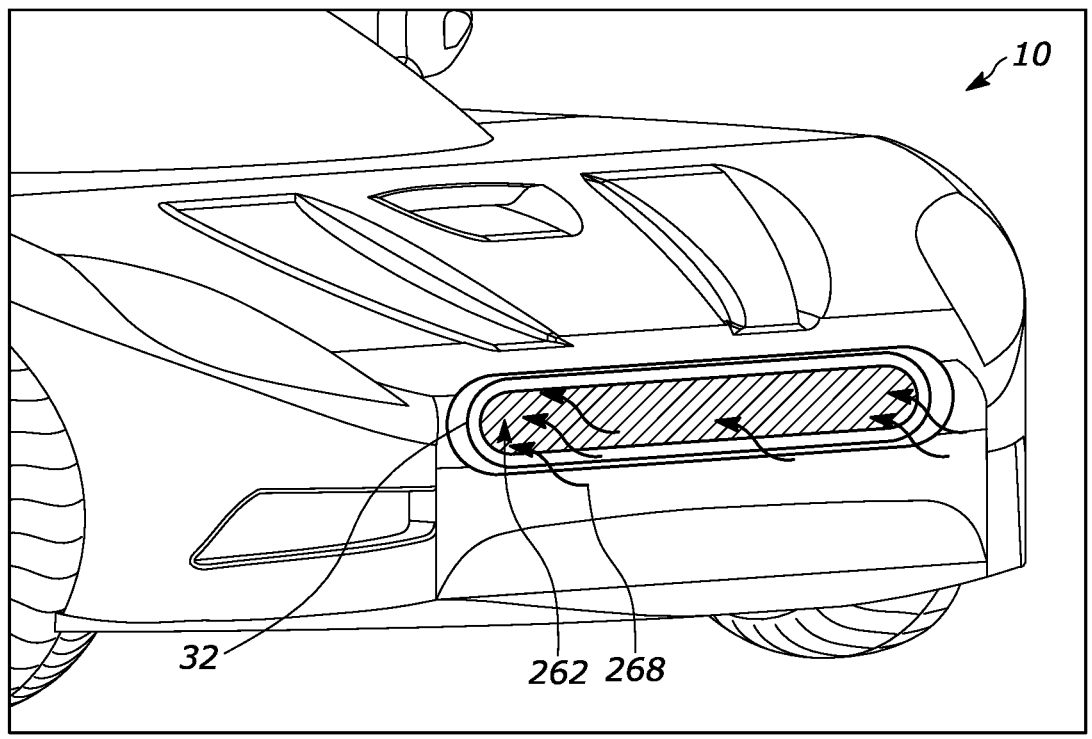
FIG. 18B is an enlarged perspective view of an integral electrode disposed along a grill, a proximal component, and a distal component of a motor vehicle in accordance with the teachings of the present disclosure.

Referring to FIGS. 18A-18B, the integral electrode 30 may include a supplemental anodic terminal portion 36 that is communicably coupled to the controller 40 (not shown). In one form, the at least one exterior component 20 is provided by a grill 262, a proximal component 264 (e.g., a radiator), and a distal component 266 (e.g., engine bay paneling or other engine bay components) of the motor vehicle 10. The cathodic terminal portion 32 is disposed along the grill 262, the anodic terminal portion 34 is disposed along the proximal component 264, and the supplemental anodic terminal portion 36 is disposed along the distal component 266. In response to the motor vehicle 10 being in the active mode and the integral electrode 30 receiving the electrical power from the power supply 50, the integral electrode 30 ionizes molecules in the air proximate the cathodic terminal portion 32, the anodic terminal portion 34, and the supplemental anodic terminal portion 36 (i.e., the grill 262, the proximal component 264, and the distal component 266), thereby selectively generating both a proximal and a distal flow of air along the managed airflow vector, as indicated by arrows 268. Accordingly, the ionic airflow management system 1 inhibits drag and lift and therefore improves the fuel economy/battery range of the motor vehicle 10.

In one form and referring to FIG. 19, the motor vehicle 10 includes electroluminescent strips 270A, 270B (collectively referred to hereinafter as electroluminescent strips 270) disposed on the at least one exterior component 20 of the motor vehicle 10. In this form, the integral electrode 30 is secured to the electroluminescent strips 270. Specifically, the cathodic terminal portion 32 may be secured to electroluminescent strip 270A, and the anodic terminal portion 34 may be secured to electroluminescent strip 270B. The electroluminescent strips 270 may be provided by, for example, an electroluminescent tape or the like. The integral electrode 30 may be secured to the electroluminescent strips 270 using an adhesive, a fastener, or the like.

In one form and referring to FIG. 20, the cathodic terminal portion 32 may include cathodic terminal portion zones 33-1, 33-2, ... 33-n (collectively referred to hereinafter as "cathodic terminal portion zones 33"), and the anodic terminal portion 34 may include anodic terminal portion zones 35-1, 35-2, ... 35-n (collectively referred to hereinafter as "anodic terminal portion zones 35"). The controller 40 is configured to dynamically vary the spacing between the cathodic terminal portion 32 and the anodic terminal portion 34 by adjusting a position and/or orientation of the cathodic terminal portion zones 33 and the anodic terminal portion zones 35 via electromechanical actuators 80. While FIG. 20 illustrates one electromechanical actuator 80 associated with each of the cathodic terminal portion zones 33 and the anodic terminal portion zones 35, it should be understood that one electromechanical actuator 80 may be associated with any number of the cathodic terminal portion zones 33 and the anodic terminal portion zones 35 in other variations.

As an example, when the controller 40 determines that the motor vehicle 10 is in the active mode (i.e., the speed of the motor vehicle 10 is greater than a threshold speed), the controller 40 controls the electromechanical actuators 80 to reduce the spacing between a set of the cathodic terminal portion zones 33 and a set of the anodic terminal portion zones 35 (e.g., reduce the spacing between cathodic terminal portion zones 33-1, 33-2 and anodic terminal portion zones 35-1, 35-2, respectively). As another example, when the controller 40 determines that the motor vehicle 10 is in the inactive mode (i.e., the speed of the motor vehicle 10 is less than a threshold speed), the controller 40 controls the electromechanical actuators 80 to adjust the spacing between the cathodic terminal portion zones 33 the anodic terminal portion zones 35 to a nominal or default position. In one form, the nominal or default position corresponds to a position/orientation in which the spacings between cathodic terminal portion zones 33 and the corresponding anodic terminal portion zones 35 are equal.

In one variation, the electromechanical actuators 80 may be removed from the motor vehicle 10 when the cathodic terminal portion 32 and the anodic terminal portion 34 are provided by a shape memory alloy. Specifically, the controller 40 is configured to selectively apply electrical power the cathodic terminal portion 32 and the anodic terminal portion 34 to adjust a position and/or orientation of the cathodic terminal portion zones 33 and the anodic terminal portion zones 35. As such, the controller 40 may dynamically vary the spacing between the cathodic terminal portion 32 and the anodic terminal portion 34 and, more specifically, the spacing between the cathodic terminal portion zones 33 and the anodic terminal portion zones 35 by controlling the magnitude and/or duration of electrical power provided to the cathodic terminal portion 32 and the anodic terminal portion 34.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An ionic airflow management system for a motor vehicle, the ionic airflow management system comprising:
    a controller;
    a power supply in communication with the controller;
    at least one exterior component of a motor vehicle having an integral electrode in electrical communication with the power supply, the integral electrode comprising a cathodic terminal portion and an anodic terminal portion oriented relative to a managed airflow vector; and
    at least one sensor in communication with the controller, the at least one sensor including a speed sensor,
    wherein the power supply receives signals from the controller to:
        supply a predetermined amount of electrical power to the integral electrode based on a threshold speed detected by the speed sensor in an active mode, thereby controlling a speed and direction of airflow between the cathodic terminal portion and the anodic terminal portion; and
        switch off electrical power to the integral electrode below the threshold speed in an inactive mode.

2. The ionic airflow management system according to claim 1, wherein the at least one exterior component comprises a front fascia and the cathodic terminal portion is disposed along a lower portion of the front fascia and the anodic terminal portion is disposed along an upper portion of the front fascia, thereby generating an upward flow of air along the managed airflow vector.

3. The ionic airflow management system according to claim 1, wherein the at least one exterior component comprises a splitter and the cathodic terminal portion is disposed along a leading edge of the splitter and the anodic terminal portion is disposed along a trailing edge of the splitter, wherein the controller communicates with the power supply to control an amount of downforce on the splitter.

4. The ionic airflow management system according to claim 1, wherein the at least one exterior component comprises a rear fascia and the cathodic terminal portion is disposed along a lower portion of the rear fascia and the anodic terminal portion is disposed along an upper portion of the rear fascia, thereby generating an upward flow of air along the managed airflow vector.

5. The ionic airflow management system according to claim 1, wherein the at least one exterior component comprises a rear diffuser and the cathodic terminal portion is disposed along a portion of an underbody of the motor vehicle and the anodic terminal portion is disposed along a trailing edge of the rear diffuser, wherein the controller communicates with the power supply to control an amount of downforce on the rear diffuser.

6. The ionic airflow management system according to claim 1, wherein the at least one exterior component comprises a rear diffuser and the cathodic terminal portion is disposed along a rear decklid or a trailing edge of a roof of the motor vehicle and the anodic terminal portion is disposed along a trailing edge of the rear diffuser, wherein the controller communicates with the power supply to control an amount of downforce on the rear diffuser.

7. The ionic airflow management system according to claim 1, wherein the at least one exterior component comprises an underbody of the motor vehicle and the cathodic terminal portion is disposed along a forward portion of the underbody and the anodic terminal portion is disposed along a rear portion of the underbody, wherein the controller communicates with the power supply to control an amount of downforce on the underbody.

8. The ionic airflow management system according to claim 1, wherein the at least one exterior component comprises one of a tailgate, a liftgate, or a decklid and the cathodic terminal portion is disposed along an upper portion of the tailgate, liftgate, or decklid and the anodic terminal portion is disposed along a lower portion of the tailgate, liftgate, or decklid, thereby generating a downward flow of air along the managed airflow vector.

9. The ionic airflow management system according to claim 1, wherein the at least one exterior component comprises a wheel house liner and the cathodic terminal portion is disposed along a lower portion of the wheel house liner and the anodic terminal portion is disposed along an upper portion of the wheel house liner, thereby generating an upward flow of air along the managed airflow vector.

10. The ionic airflow management system according to claim 1, wherein the at least one exterior component comprises a mud flap and the cathodic terminal portion is disposed along an upper portion of the mud flap and the anodic terminal portion is disposed along a lower portion of the mud flap, thereby generating a downward flow of air along the managed airflow vector.

11. The ionic airflow management system according to claim 1, further comprising a supplemental anodic terminal portion, wherein the at least one exterior component comprises a grill and the cathodic terminal portion is disposed along the grill, the anodic terminal portion is disposed along a proximal component of the motor vehicle, and the supplemental anodic terminal portion is disposed along a distal component of the motor vehicle, thereby selectively generating both a proximal and a distal flow of air along the managed airflow vector.

12. The ionic airflow management system according to claim 1, wherein the at least one exterior component comprises a grill and the cathodic terminal portion is disposed along a forward fascia of the motor vehicle, the anodic terminal portion is disposed along the grill, thereby generating a distal flow of air along the managed airflow vector.

13. The ionic airflow management system according to claim 1, wherein the at least one exterior component comprises a grill and the cathodic terminal portion is disposed along the grill, the anodic terminal portion is disposed along a radiator of the motor vehicle, thereby generating a distal flow of air along the managed airflow vector.

14. The ionic airflow management system according to claim 1, wherein the at least one exterior component comprises a side view mirror and the cathodic terminal portion is disposed along a forward portion of the side view mirror, the anodic terminal portion is disposed along a rear portion of the side view mirror, thereby generating a distal flow of air along the managed airflow vector.

15. The ionic airflow management system according to claim 1, wherein the at least one exterior component comprises a moon roof and the cathodic terminal portion is disposed along a leading edge portion of the moon roof, the anodic terminal portion is disposed along a trailing edge portion of the moon roof, thereby generating a distal flow of air along the managed airflow vector.

16. The ionic airflow management system according to claim 1, wherein the at least one exterior component comprises rear doors of a tractor trailer and the cathodic terminal portion is disposed along an upper portion of the rear doors and the anodic terminal portion is disposed along a lower portion of the rear doors, thereby generating a downward flow of air along the managed airflow vector.

17. The ionic airflow management system according to claim 1, further comprising electroluminescent strips of material disposed on the at least one exterior component of the motor vehicle, wherein the integral electrode is secured to electroluminescent strips of material.

18. The ionic airflow management system according to claim 1, wherein the integral electrode comprises one of shape memory alloys, electrically conductive inks, electrically conductive paints, electrically conductive coatings, and electrically conductive tapes.

19. The ionic airflow management system according to claim 1, wherein:
the controller is configured to control, via a plurality of electromechanical actuators, a spacing between the cathodic terminal portion and the anodic terminal portion based on a mode of the motor vehicle; and
the mode is one of the active mode and the inactive mode.

20. The ionic airflow management system according to claim 19, wherein:
the cathodic terminal portion includes a plurality of cathodic terminal portion zones;
the anodic terminal portion includes a plurality of anodic terminal portion zones; and
the controller is configured to control the spacing between the cathodic terminal portion and the anodic terminal portion by independently adjusting at least one of a position and an orientation of the plurality of cathodic terminal portion zones and the plurality of anodic terminal portion zones.

* * * * *